July 6, 1926.
L. C. LUTYENS
MEANS AND METHOD FOR USE IN THE MANUFACTURE OF SHEETING FROM TACKY PLASTIC MATERIALS
Filed April 20, 1926
1,591,170
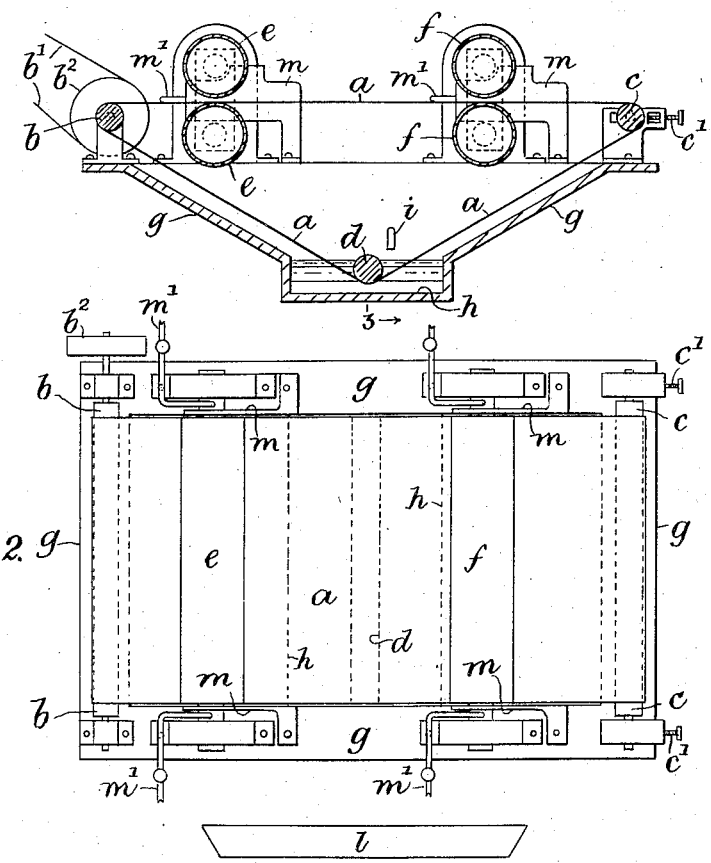

Patented July 6, 1926.

1,591,170

UNITED STATES PATENT OFFICE.

LIONEL CHARLES LUTYENS, OF LONDON, ENGLAND.

MEANS AND METHOD FOR USE IN THE MANUFACTURE OF SHEETING FROM TACKY PLASTIC MATERIALS.

Application filed April 20, 1926. Serial No. 103,207.

This invention relates to the manufacture in sheet form of materials having in their composition a mixture of bitumen, pitch or the like and consists in a novel method of and apparatus for effecting such manufacture whereby the operation is simplified and expedited and the quality of the sheeting is improved.

The invention is particularly applicable for use in connection with the bituminated mixture forming the subject of my and Reginald Oswald Child's patent application Serial Number 21,181, filed 6th April, 1925, but it is also capable of employment in rendering other materials of a similar character or composition in sheet form.

According to this invention, the bituminated mixture which is of dough-like consistency is rendered plastic by heating the same to a temperature of approximately 400° Fahr. and in this heated condition is applied to an endless travelling apron or table composed of fabric and arranged about and between rollers. The apron is preserved in a wet condition by passing the same at one point through a bath of cold water, which is preferably in running or changing condition, and the bituminated mixture thereon is continually wetted with water by means of the rollers between which it passes, the said rollers being sprinkled with or acted on continually by cold water sprays.

The water prevents the mixture adhering to the fabric of the apron and the rollers being sprinkled with water are also kept clear of the mixture which is thereby prevented from sticking thereto. The water provides a film whereby not only adherence of the mixture is prevented but the rollers are cooled.

To preserve an approximately even temperature throughout the width of the layer of mixture on the apron, heat is applied at the edges of the said layer at or about the point of its passage through the rollers thereby preventing or minimizing any tendency for the mixture to lose heat towards the sides thereof.

The apparatus comprises a vessel adapted to receive the several rollers which are rotatively mounted thereon and about and between which the fabric apron or table is arranged to travel, the vessel being formed or provided with a well or transverse channel in the floor thereof for the passage of the running or changing water through which the apron at that point travels. Above the rollers between which the apron runs are sprayers for water the sprays playing on the said rollers to keep them cool and clear of the mixture carried on the apron. One or more of the rollers about which the apron is stretched may be driven from any suitable motor by a belt or other means. Owing to the tendency of the mixture to become cold and to lose its plasticity at the sides or edges, provision is made for imparting heat thereto by means of cheek plates which may conveniently be located at or about the ends of the sprayed rollers; the heating being effected by gas jets arranged to impinge the cheek plates. These cheek plates also serve to provide a flange whereby the mixture is prevented from spreading beyond the limit of the roller ends. The apron is rendered adjustable by screw regulated bearings or otherwise so that it may be maintained in a taut and working condition.

In order that the invention may be readily understood and carried into effect same will now be more fully described with reference to the accompanying drawings in which:—

Figure 1 is a longitudinal section of a form of the apparatus for carrying out the improved method of sheeting.

Figure 2 is a corresponding plan the spraying means for the rollers being omitted.

Figure 3 is a transverse section approximately on the line 3—3 in Figure 1.

$a$ indicates the apron or table of fabric which is in the form of an endless band and arranged to travel about the rollers $b$, $c$, $d$ and between the pairs of rollers $e\ e$ and $f\ f$. The rollers $b$, $c$ and $e$, $f$, are mounted in suitable supports and bearings on the upper part of a vessel $g$; the roller $d$ being arranged in the bottom of the said vessel which is formed with a well or channel $h$ so that the fabric apron is caused to travel through cold water supplied to the channel by means of a feed pipe $i$ or other suitable source of supply. The water is allowed to run away from the channel by way of an outlet pipe $k$ shown in dotted lines in Figure 3. Thus a runing or changing stream of water is maintained in the channel $h$. One of the rollers $b$, $c$ is shown as being driven rotatively by means of a belt $b^1$ and pulley $b^2$ the motive power being derived from some available source not known. The rollers $e$, $e$ and $f$, $f$ are sprayed with cold water by means of air jets indicated diagrammatically at $l\,l$ and the apron is kept in a wet condition by its passage through the water channel $h$, the bituminated mixture thereon being thereby prevented from adhering to its surface. The spraying of the rollers $e$ and $f$ not only keeps them clear of the mixture and prevents the same adhering thereto but furnishes a film on the rollers to keep them cool. In the apparatus illustrated two pairs of rollers $e\,e$ and $f\,f$ are shown but it is not a necessity to duplicate the rollers although by the arrangement described and shown a better finish is imparted to the product.

The fabric apron or table $a$ is maintained in tension by mounting one of the rollers $b$, $c$ in an adjustable bearing. In the example illustrated the roller $c$ is so mounted, same being adjustable by means of the screws $c^1\,c^1$.

It will be seen that the bituminated mixture is applied to the fabric apron or table and carried thereby between the rollers $e\,e$ and $f\,f$ and through the water channel $h$ while being wetted by contact with the rollers $e\,e\,f\,f$ which receive water from the spraying sources $l\,l$. Thus the surfaces of the rollers are cooled and freed from any particles of bituminated mixture and the apron is also enabled to resist any tendency for the mixture to adhere thereto.

The bituminated mixture in passing through the apparatus is liable to lose heat at the edges or sides and in order to prevent undue loss of heat and plasticity the said edges or sides are heated by means of plates or cheeks $m\,m$ which receive heat from gas jets indicated by the pipes $m^1\,m^1$ the jets from said pipes impinging on the plates $m\,m$ and heating the same. The said plates being in close proximity to the sides or edges of the mixture layer on the apron $a$, transmits heat thereto and keeps the same from becoming cold and nonplastic. The plates or cheeks also serve as flanges in restricting the lateral extent of the layer and preserve a clean edge to the sheeting.

It may be observed that in using the bituminated mixture hereinbefore referred to no fibre is required in the treatment described as the dough-like mixture itself contains the necessary amount of fibre or filler for enabling it to form a texture and impart the required strength to the sheet product.

What I claim and desire to secure by Letters Patent is:—

1. The herein described method of manufacturing sheeting which consists in heating a bituminated mixture of dough-like consistency to render it plastic, applying the heated and plastic mixture to an endless travelling apron of fabric, passing the latter with its layer of bituminous mixture between water sprayed rollers and through a cold water bath and between means adapted to heat the edges of the layer and prevent same from becoming cooled and deplasticized and to restrict the lateral extent of the layer.

2. Apparatus for the manufacture of sheeting which comprises a vessel having a series of rollers mounted relatively thereto, a travelling fabric apron extended about some of said rollers and a water channel in the bottom thereof, rollers for the apron to pass between, means for spraying said rollers with water, means for heating the edges of the sheet of bituminated mixture on the apron on its passage between said rollers, means for operating one or more of the apron carrying rollers to impart the travelling movement to the apron and means for maintaining the apron taut.

3. Apparatus for the manufacture of sheeting which comprises a vessel having a channel in the bottom thereof, a travelling apron of fabric for conducting the layer of bituminated mixture, rollers for supporting and extending said apron, means for moving said apron, two pairs of rollers for the mixture and the apron to pass between, means for spraying said rollers with water, heating places forming cheeks at the sides of the layer of bituminated mixture on the apron, gas jets for heating said cheeks and means for supplying the channel with running or changing water.

In witness whereof I have subscribed my signature.

L. C. LUTYENS.